United States Patent [19]
Maddrick

[11] Patent Number: 4,466,672
[45] Date of Patent: Aug. 21, 1984

[54] VARIABLE PRESSURE RATIO VALVE FOR VEHICLE BRAKING SYSTEM HAVING DOUBLE VALVE ASSEMBLY SET AS FUNCTION OF VEHICLE LOAD

[75] Inventor: Bernard D. Maddrick, Bristol, England

[73] Assignee: Bendix Limited, Bristol, England

[21] Appl. No.: 307,126

[22] Filed: Sep. 30, 1981

[30] Foreign Application Priority Data

Oct. 1, 1980 [GB] United Kingdom ................. 8031561
Feb. 5, 1981 [GB] United Kingdom ................. 8103539

[51] Int. Cl.³ .......................... B60T 8/18; B60T 15/20
[52] U.S. Cl. .................................... 303/22 R; 303/40
[58] Field of Search ................. 303/22 R, 22 A, 6 C, 303/6 R, 23 A, 23 R, 28, 29, 30, 40, 7, 9, 13, 22, 23; 188/195, 349; 137/627.5

[56] References Cited

U.S. PATENT DOCUMENTS

| | | | |
|---|---|---|---|
| 3,671,087 | 6/1972 | Pekrul | 303/22 R X |
| 3,937,975 | 2/1976 | Yanagawa et al. | 303/40 X |
| 4,236,761 | 12/1980 | Page | 303/22 R X |

FOREIGN PATENT DOCUMENTS

| | | | |
|---|---|---|---|
| 2017849 | 10/1979 | Fed. Rep. of Germany | 303/22 R |
| 2824459 | 12/1979 | Fed. Rep. of Germany | 303/22 R |
| 2918032 | 11/1980 | Fed. Rep. of Germany | |
| 1029183 | 5/1966 | United Kingdom | |
| 1077904 | 8/1967 | United Kingdom | |
| 1327526 | 8/1973 | United Kingdom | |
| 2003566 | 3/1979 | United Kingdom | 303/22 R |
| 2046383 | 11/1980 | United Kingdom | |
| 1588039 | 4/1981 | United Kingdom | |
| 2084677 | 4/1982 | United Kingdom | 303/22 R |

Primary Examiner—Douglas C. Butler
Attorney, Agent, or Firm—Ken C. Decker; William N. Antonis

[57] ABSTRACT

A variable load valve for a vehicle braking system has a variable area ratio assembly the effective area ratio of which changes to tend to counteract unbalance of pressures between an input port and an output port and a double valve assembly which is moveable by a load dependent mechanism relative to the variable area ratio assembly, the double valve being arranged in the manner of a relay valve between the output port and a supply port or a vent port to relay pressure from the supply port to the output port in accordance with the magnitude pressure at the input port and the position setting of the double valve relative to the variable area ratio assembly. By provision of a further pressure responsive device a check valve and a further port the valve is adapted also to perform the function of a relay emergency valve.

9 Claims, 5 Drawing Figures

VARIABLE PRESSURE RATIO VALVE FOR VEHICLE BRAKING SYSTEM HAVING DOUBLE VALVE ASSEMBLY SET AS FUNCTION OF VEHICLE LOAD

This invention relates to variable pressure ratio valves and relates especially to variable load valves for use in vehicle fluid pressure braking systems.

In fluid pressure braking systems for vehicles it has been proposed to provide variable pressure ratio valves operable in accordance with a mechanical signal or a fluid pressure signal dependent upon the load on a vehicle to adjust the ratio of an output pressure in relation to an input pressure to control the degree of braking pressure produced by a given control input pressure to the variable pressure ratio valve.

One such variable pressure ratio valve is described in the specification of British Pat. No. 1,029,183 and various modifications and adaptions of such a valve have subsequently been produced commercially.

On trailer vehicles used on public highways it is usual furthermore for an emergency feature to be required and such an emergency feature is normally provided by a relay emergency valve which responds to collapse of a trailer emergency line pressure to connect a trailer reservoir to the brake actuators of the trailer to effect full braking. The trailer emergency valve may typically also include a path for normal charging of the trailer reservoir from an intact emergency line.

In many variable pressure ratio valves, the output pressure is derived from the input pressure itself. This is usually entirely satisfactory for single vehicles or tractor vehicles or a tractor-trailer combination but in the case of a trailer the brakes of which are controlled from a tractor vehicle via a trailer pressure line and a relay emergency valve, it is usually a requirement to supply the braking pressure to the trailer brakes from a source of pressure provided by a reservoir located on the trailer itself. In such a case, the output of a variable pressure ratio valve on the trailer has hitherto been applied as a control pressure to a further relay valve supplied from such a reservoir.

Proposals have also been made to combine the further relay valve on the one hand and the variable pressure ratio valve on the other hand into a single housing for convenience of mounting and piping thereof on a trailer vehicle but such single units as hitherto proposed tend to be rather complex and relatively expensive.

The object of the present invention is to provide a variable pressure ratio valve which reduces complexity such as the above.

According to the present invention there is provided a variable pressure ratio valve comprising a housing having an input port, an output port and a fluid pressure supply port, a variable area ratio assembly displaceable in response to the balance of fluid pressures at the input port and the output port and the ratio of the respective areas thereof subject to said pressures being determined by the position of the assembly, a double valve assembly movable over a range of positions in the housing relative to the variable area ratio assembly and co-operable therewith to apply fluid pressure to the output port from a source connected to the supply port dependent upon the position of the double valve assembly.

In a preferred embodiment of the invention, a valve closure member of the double assembly is carried by the variable ratio area assembly.

By virtue of the invention, the variable pressure ratio valve is able itself to operate as a relay valve and when used as a variable load valve in a fluid pressure trailer brake system, the need for a relay valve either separate from or combined with the variable load valve is avoided.

In order that the invention may be more clearly understood and readily carried into effect, the same will be further described by way of example with reference to the accompanying drawings of which:

Figure 1:
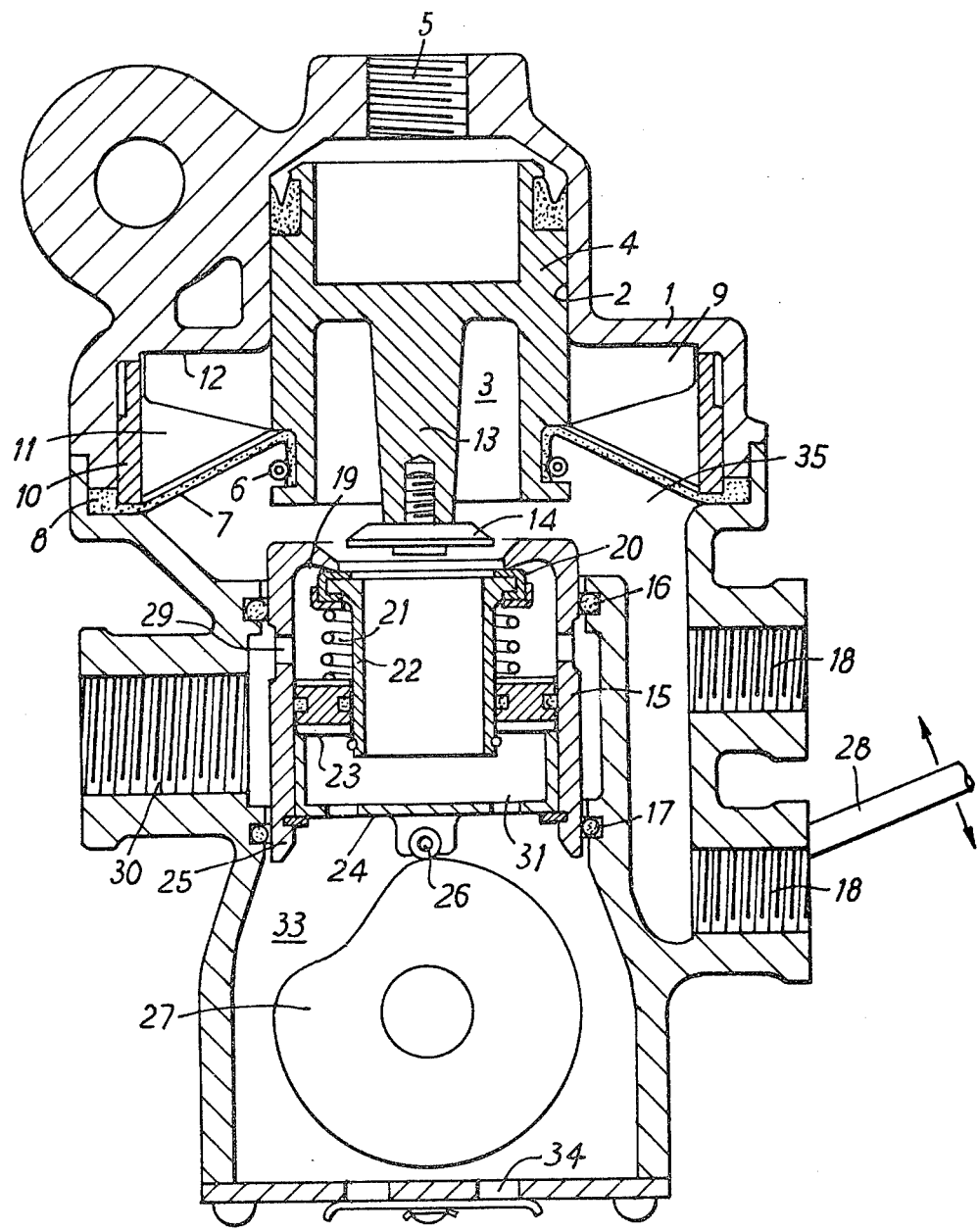
FIG. 1 illustrates in diagrammatical form a variable ratio valve in accordance with one embodiment.

The variable pressure ratio valve of FIG. 1, consists of a housing 1 including a cylinder and diaphragm chamber 2 with a variable area ratio assembly denoted by the general reference 3 slideable therein. The variable area ratio assembly comprises a piston 4 the upper surface of which is subject to whatever control pressure is present at a control input port 5. The lower portion of the piston 4 is provided with an outer annular groove 6 within which the inner periphery of an annular diaphragm 7 is clamped, the outer periphery 8 of the diaphragm 7 being clamped into the housing. Extending radially from the piston 4 above the diaphragm 7 there are twenty-four identical outwardly directed fingers such as 9 which are closely inter-digitated with inwardly directed fingers 11 of an insert 10 clamped together with the diaphragm within the housing. In the position shown, the fingers 9 rest against an upper shoulder 12 of the housing and the diaphragm 7 rests against the lower surfaces of the fingers 11. The lower surfaces of the fingers 9 and 11 are seen to be such that with a downward deflection of the piston 4, the diaphragm peels away from the fingers 11 onto the fingers 9 whereby the effective area of the diaphragm acting in conjunction with the piston 4 changes in accordance with the variable area ratio characteristic of the assembly 3.

Extending downwardly from the piston 4 there is a central member 13 the lower end of which carries the exhaust valve closure member 14 of a movable double valve assembly. This double valve assembly comprises a cylindrical portion 15 sealingly slidable in annular seals 16 and 17 retained in the housing such as to isolate a lower atmospheric chamber 33 from the region 35 beneath the diaphragm 7 which communicates with a pair of output ports 18 provided in the housing. The cylindrical member 15 provides an annular valve member at 19 against which a resilient seat 20 which is spring loaded within the double valve assembly is urged by a spring 21. The resilient seat 20 is provided on an upper outwardly extending flange of a slideable tabular portion 22 which extends downwards through an annular sealing member 23 retained in the cylindrical member 15 by a cam follower member 24 and a circlip 25. The cam follower member 24 has a downward extention with a roller 26 which rests on the surface of a cam 27 journalled in an atmospheric region 33 of the housing and is rotatable by a lever 28 adapted to be coupled into a vehicle suspension in a manner normal with previously known forms of variable load valve.

The diameter of the valve closure member 14 is such as to be able to freely pass through the internal diameter of the valve member 19 so as to be engageable also with the upper surface of the resilient valve seat 20 of the double valve assembly. A plurality of apertures such as 29 are provided in the cylindrical member 15 which apertures are always between the seals 16 and 17 such as to provide a path for fluid pressure from a supply source at an input supply port 30 to the region surrounding the tubular member 22. Additionally, the central bore of the tubular member 22 communicates with the atmospheric region 33 via apertures such as 31 in the cam follower 24.

In operation of the variable pressure ratio valve, it is to be assumed by way of example that the valve is mounted to the chassis of a trailer vehicle towed by a tractor vehicle provided with a trailer brake control pipe connected to a relay emergency valve on the trailer. Assuming that the trailer is a long one the pipes to the rear axles are connected to an input port 5 of the valve described above which is mounted conveniently near the rear axles and supplied from a further reservoir additional to that for the relay emergency valve. Furthermore, a trailer reservoir is connected to the input supply port 30 and respective brake actuators for the trailer are connected to the output ports 18. The lever 28 is coupled to the sprung wheel assembly of the trailer and in the position shown, the valve is thereby set to a condition representing a heavy loading of the trailer.

On application of a fluid pressure to the control port 5 from the tractor vehicle, the piston 4 tends to be deflected downwards until it meets the resilient valve seat 20 thereby closing off the connection between the output ports 18 and atmosphere via chamber 33 and a vent 34. Further downward movement tends to unseat the resilient seat 20 from the annular valve member 19 thereby providing a communication between the supply port 30 and output ports 18 and at the same time the pressure in the region 35 beneath the diaphragm 7 builds up to a point at which the variable area ratio assembly is set to a pressure balancing position. At this point, the pressure acting in region 35 acts upwards to the extent that the valve seat 20 is again permitted to seat against the valve member 19. The pressure at the output port is therefore a pressure determined by the control pressure at 5 and the position of the double valve assembly as controlled by the by the lever 28 and the load of the vehicle. In the event of the vehicle being less loaded, the lever 28 takes up a position whereby the cam follower 24 moves nearer to the centre of the cam axis and therefore for a given level of control pressure at the port 5, the variable area ratio assembly needs to be deflected further downwards before engagement occurs of the valve member 14 and the seat 20. It is therefore seen that in the equilibrium position, the effective area of the diaphragm 7 which is presented to the pressure in the region 19 is greater than previously and therefore the variable ratio assembly stabilises with a lower value of output pressure at ports 18.

Figure 2:
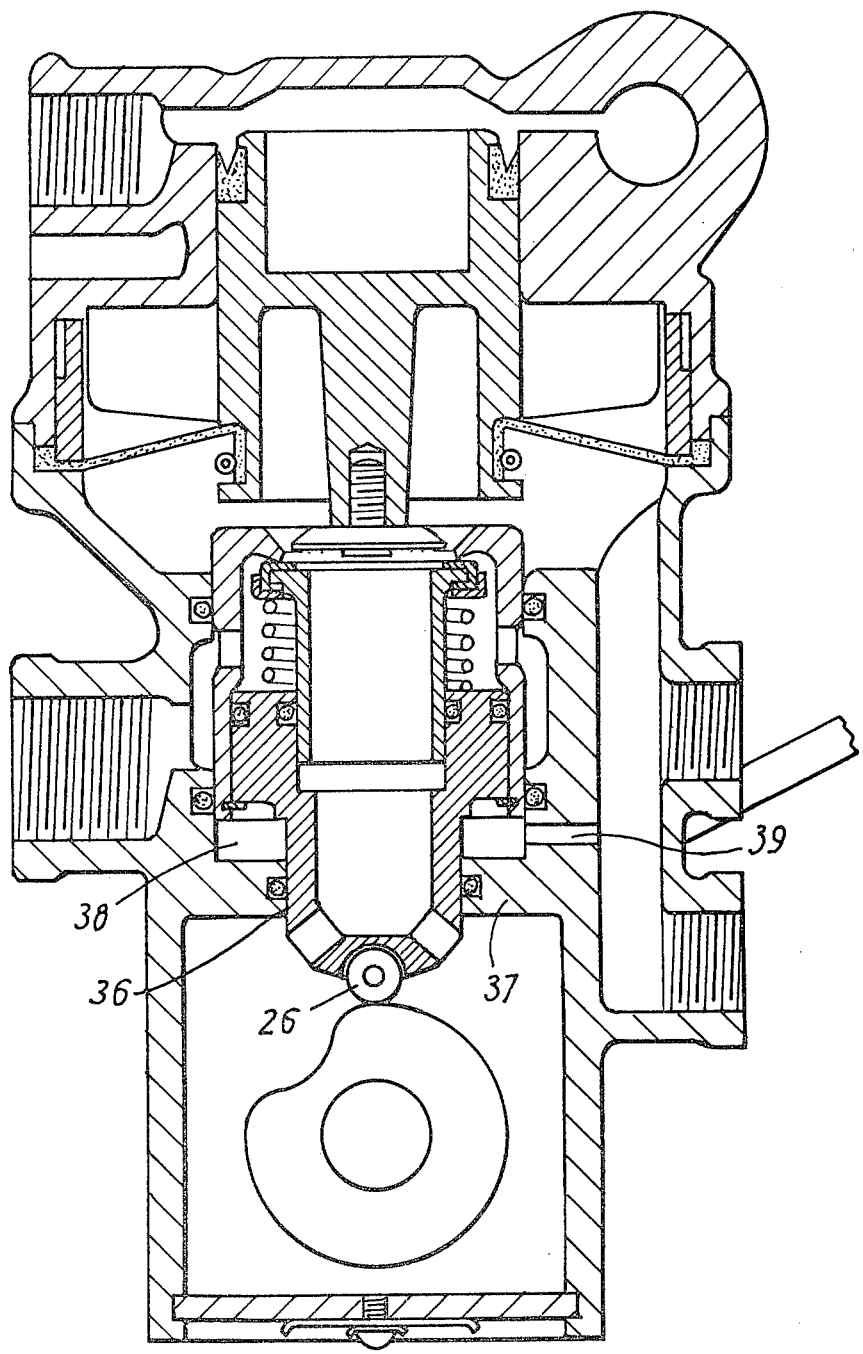
FIG. 2 illustrates a modification of a variable ratio valve as shown in FIG. 1.

The variable pressure ratio valve of FIG. 2 is similar in all respects to the valve of FIG. 1, but it has the added feature that the projection 36 which carries the roller 26 is sealingly slideable in an additional wall 37 formed in the housing to thereby provide an extra chamber 38 which is connected to the output ports by a passage 39. By virture of this extra chamber the output pressure is able to act upon the moveable valve assembly to reduce the force exerted on the cam by roller 26.

Figure 3:
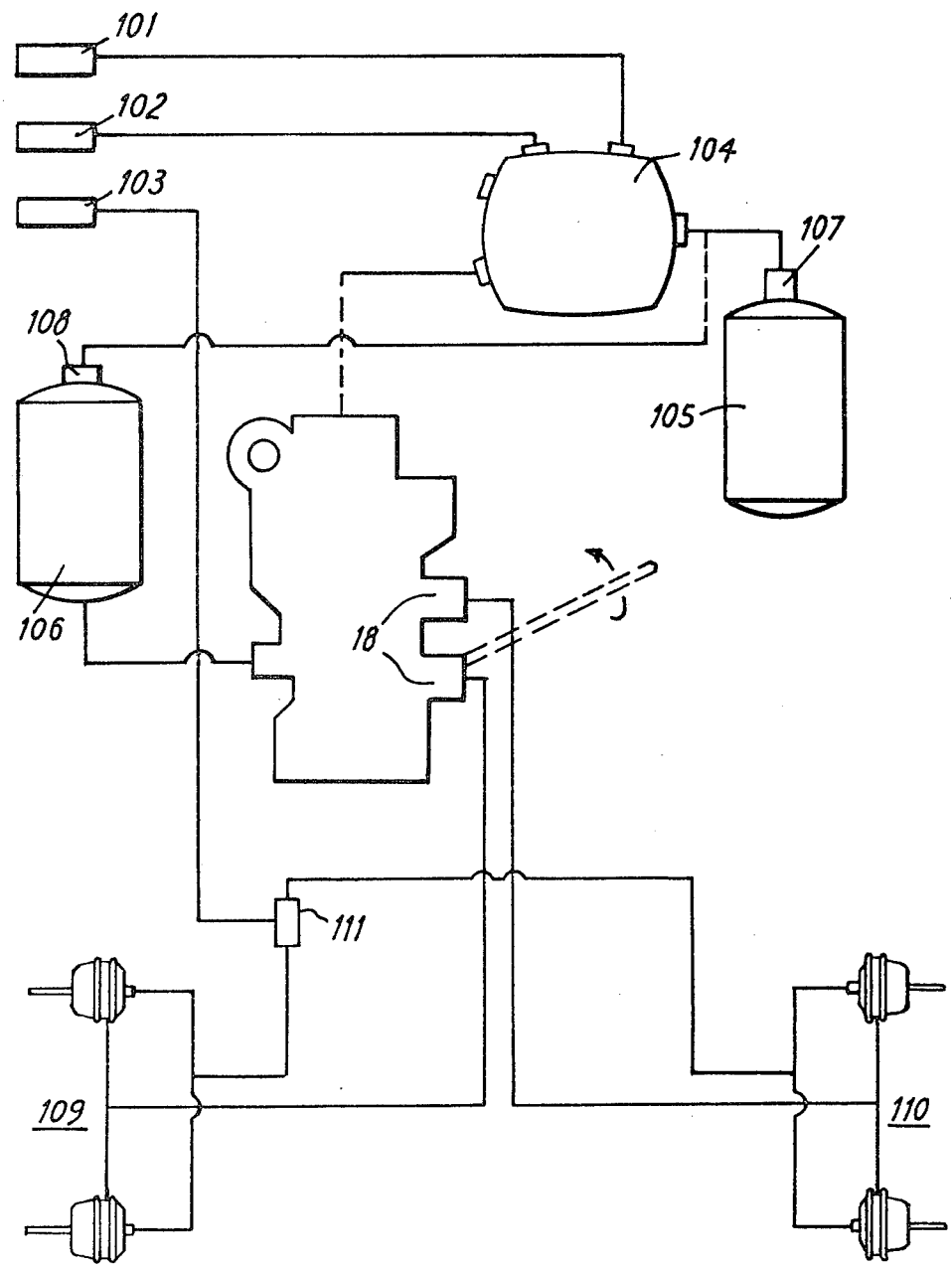
FIG. 3 illustrates a typical fluid pressure trailer vehicle braking system using such a valve.

The variable ratio valve of FIG. 1 is shown in FIG. 3 included in a three line trailer braking system, the trailer being provided with couplers 101, 102 and 103 to service emergency and secondary circuit lines. The service and emergency couplers are connected to a relay emergency valve 104 of known form one output to which is connected to a reservoir 105 and another aspect of which is connected to the control input 5 of the variable ratio valve. This valve is located at the rear end of the trailer and is provided with a further reservoir 106. Each reservoir is supplied from the relay emergency valve via a respective protection valve 107 and 108.

The remainder of the circuit is conventional, the brakes being provided with double diaphragm actuators 109, 110 the service chambers of which are supplied from the service pressure outputs 18 of the variable ratio relay valve and the secondary chambers of which are supplied from the secondary line coupler 103 via a quick release valve. The secondary chambers may be replaced by spring brakes if required.

The variable ratio valve of FIG. 2 may be substituted for the valve of FIG. 1 in the circuit of FIG. 3.

It will be seen from the foregoing that by virtue of the provision of the double valve assembly substantially separately moveable in relation to the variable area ratio assembly, the variable pressure ratio valve can be constructed to operate also in the manner of a relay valve whereby it is suitable for use on a trailer vehicle in which a trailer reservoir is provided for supplying fluid pressure to the trailer brakes.

Figure 4:
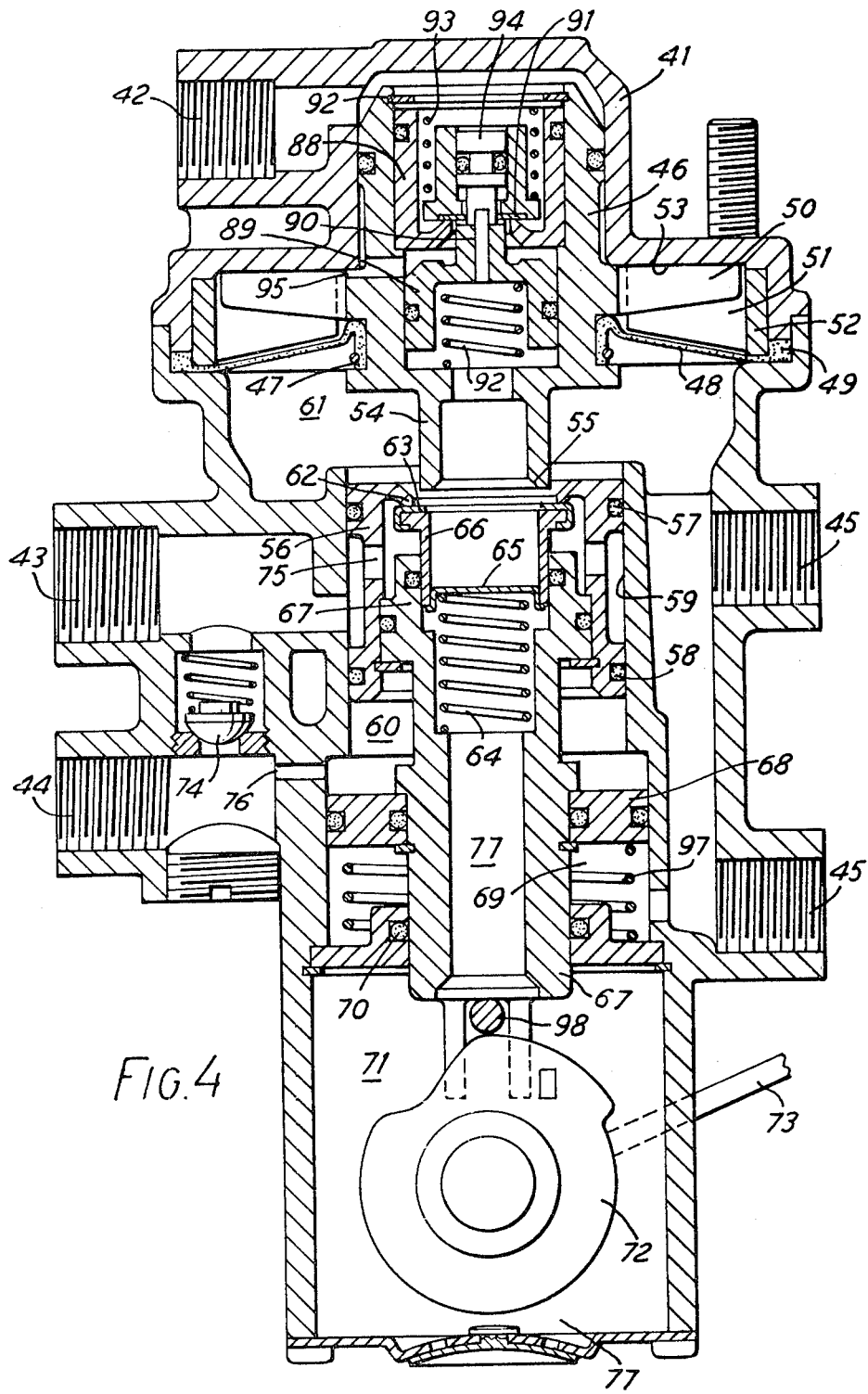
FIG. 4 illustrates a further embodiment of a variable ratio valve in accordance with the invention

The arrangement shown in FIG. 3 of a trailer braking circuit is appropriate for a long trailer but in the case of a relatively short trailer it may be appropriate to dispense with the relay function which relays pressure from the further reservoir to the trailer brakes and in order to further simplify the system FIG. 4 shows a combination of the function of the relay emergency valve and the variable load valve.

Referring to FIG. 4, the variable pressure-ratio-valve comprises a housing denoted by reference 41 having a trailer service pressure control input port denoted by reference 42 a trailer reservoir supply port denoted by reference 43, a further trailer emergency line supply port denoted by reference 44 and a pair of common brake pressure output ports 45. Sealingly slideable within the housing 41 there is a control piston 46 the upper area of which is subject to the pressure in the port 42 and the opposing area being provided by a variable area diaphragm assembly. The piston 46 is provided with an annular groove 47 within which the inner periphery of a diaphragm 48 is clamped and the outer periphery 49 of the diaphragm being clamped in the housing. Extending radially from the piston 46 above the diaphragm 48 there is a plurality of outwardly directed fingers such as 50 which are closely interdigitated with inwardly directed fingers 51 of an insert 52 clamped together with the diaphragm within the housing. In the position shown, the fingers 50 rest against the upper shoulder 53 of the housing and the diaphragm 48 rests against the lower surfaces of the fingers 51. The lower surfaces of the fingers 50 and 51 are thus seen to be such that with a downward deflection of the piston 46, the diaphragm lifts off the fingers 51 onto the fingers 50 whereby the effective area of the diaphragm acting in conjunction with the piston 46 changes in accordance with the variable area ratio characteristic of the assembly. Extending downwardly from the piston 46 there is a central tubular portion 54 the lower end 55 of which constitutes an exhaust closure valve seat of a double valve assembly.

The double valve assembly comprises a cylindrical portion 56 having annular seals 57 and 58 sealingly slideable in a central bore 59 of the housing such as to isolate a region 60 which communicates with the port 44, from a region 61 beneath the diaphragm 48 and communicating with the output ports 45. The tubular member 16 provides a valve seat 62 against which a resilient double valve member is urged by a spring 64 acting on a retainer cup 65 the outer rim of which bears against the lower end of a sleeve 66 carrying the valve member 63.

The diameter of the portion 54 is such as to be able to pass through the annular valve seat 62 to permit the seat 55 also to bear upon the resilient member 63. The sleeve 66 is sealingly slideable in a further tubular member 67 which itself is captive within and moveable with the member 56 in its turn carrying with it also a sealingly slideable annular piston 68 which isolates the region 60 from a region 69 at output port pressure. The tubular member 67 further extends downwards through a seal 70 into an atmospheric region 71 within which there is a rotatable cam 72 operable by a lever 73 to position 67 via a roller 98. A simple spring loaded check valve 74 is provided between ports 43 and 44. Passages are provided between the input port and the interior of 56 containing the double valve member 63 and a passage 76 provides communication between the port 44 and the aforementioned region 60. A central passage denoted by reference 77 provides communication between the atmospheric region 71 and the interior of the whole assembly to give access to region 61 when the valve seat 55 is lifted from the valve member 63.

An additional feature of the variable ratio area assembly is that the piston 46 thereof contains coaxially therewith an inshot valve arrangement which operates to determine a limited magnitude of fluid pressure to act above the diaphragm 48. The inshot valve arrangement comprises a first member 88 sealingly slideable within the body, of the piston, and a second member 89 of somewhat smaller outer diameter also sealingly slideable in its own cylindrical portion within the member 46 and having an upwardly extending tubular stem 90 the upper end of which is capable of sealing engagement with a valve member 91 which is normally urged downwards against an annular seat formed in a coaxial non-slideable member 88. A spring 92 urges the member 89 upwards and a slightly lighter spring 93 urges the valve seat of 91 downwards, 91 being sealingly slideable on an upward extension 94 of the member 99. The member 46 is provided with a passage 95 which provides a communication from to above the diaphragm 48 to the region between 88 and 89 and the whole assembly is retained in the piston 46 by an annular circlip 96.

Figure 5:
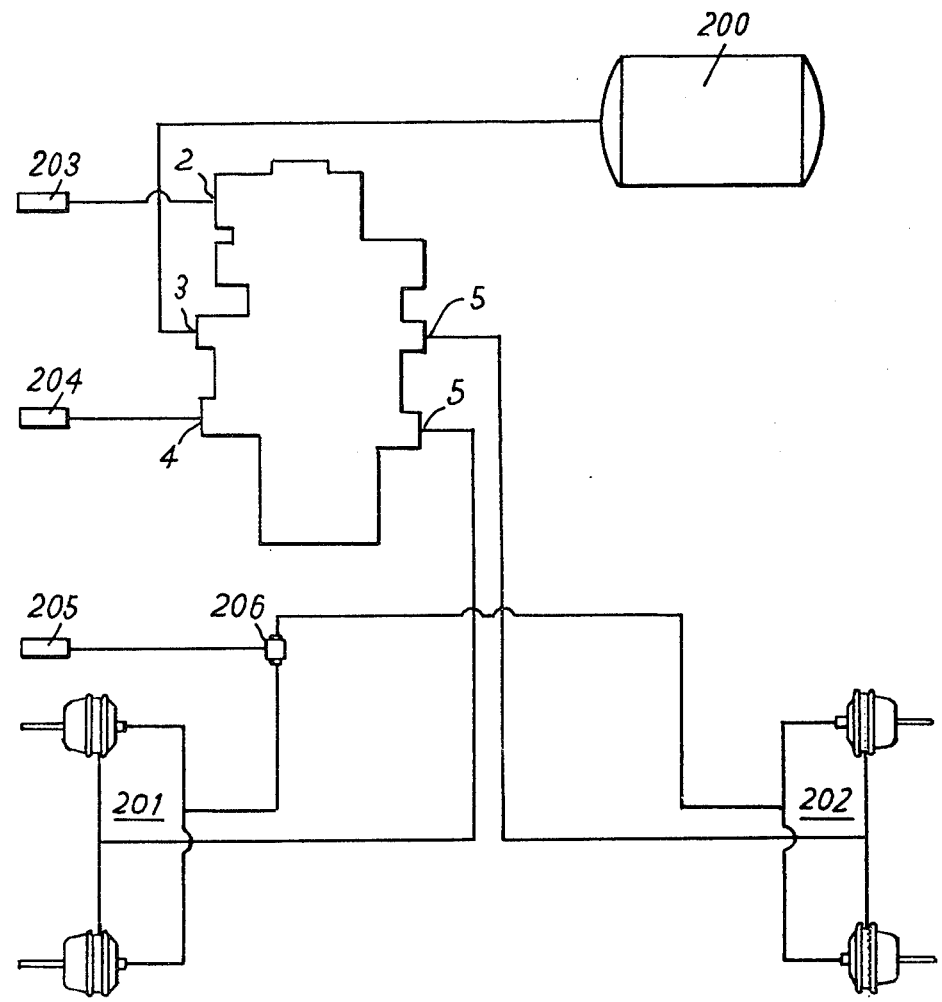
FIG. 5 illustrates a fluid pressure tractor brake circuit employing the valve of FIG. 4.

The variable ratio valve of FIG. 4 is shown in FIG. 5 included in a typical trailer braking circuit, the trailer being provided with a reservoir 200 and pairs of double diaphragm brake actuators 201 and 202 respectively. Pipe couplers 203, 204 and 205 are provided on the trailer for connection to the trailer service, trailer emergency and trailer secondary brake lines in a three line configuration, couplers 203 and 204 being connected to ports 42 and 44 respectively of the valve described above with reference to FIG. 1. The reservoir 200 is connected to the port 43 and the front and rear trailer circuits are connected for service operation to the ports 45 as shown. The secondary brake line is connected via a quick release valve 206 in conventional manner to the second diaphragms of the brake actuators. It will be seen from the description which follows that the normally required emergency function which would otherwise be provided by a separate relay emergency valve on the trailer is now provided within the variable pressure-ratio-valve assembly.

Referring to operation of the arrangement of FIG. 4, emergency supply line pressure at port 49 is fed via check valve 44 to charge the reservoir and also acts on 68 and 67 and its assembly to hold 67 downwards against spring 97, the position of 67 being determined by cam 72. Assuming moreover that a service pressure signal appears at the port 42 from the tractor vehicle and ignoring for the present the operation of the inshot assembly within the piston 46, the piston 46 is deflected downwards in response to the service pressure applied above it. The valve seat 55 therefore engages the valve member 63 sealing off the communication between the delivery ports 45 and atmosphere. Further downward movement after overcoming the stability imparted by the effect of the spring 64, causes downward movement of the member 66 thereby unseating 63 from the seat 22 to provide a communication from the port 43 and reservoir 200 via passages 75 and unseated valve member 63 to the output ports 45. Since the pressure at the output ports 45 communicates also with the underside of the diaphragm 8, there is a build up of pressure which tends to drive the variable ratio assembly including the piston 46 upwards against the action of the pressure at the input port 42. When the respective forces balance the valve 63 reseats on the seat 62 and the pressure at the ports 45 applied to the service chambers of the brake actuators stabilises. Under heavy load conditions of the vehicle, the moveable double valve assembly comprising the sealingly slideable member 56 and the components moveable therewith are set by the lever 73 to a position such as shown. In the event of the loading of the vehicle being less, the rotation of the cam 72 enables 67 and the double valve assembly to be positioned lower in the housing and thereby having the effect of presenting a greater area of the diaphragm to be effective under the influence of the pressure at the output ports 45. Accordingly, there is a proportionate reduction of the stable value of output pressure achieved for a given value of input pressure at the port 42.

Charging of the reservoir 200 connected at the port 43 is maintained via the spring loaded check valve 74 from an intact emergency line under normal operation. With an intact emergency line, the pressure therein is normally sufficient continuously to hold 67 down against the action of spring 97. In the event of a failure in the system such as trailer breakaway, giving rise to venting of the emergency line, this results in a reduction of the pressure in the input port 44 which is communicated via the passage 76 to the region 60. Since moreover the area of the annular seal member 68 is appreciably greater than the area underneath the member 56, the result is an upward movement of the 67 and its assembly under the action of the spring 97 with the result that reservoir pressure at port 43 is applied via passage 75, unseated valve 63 to the output port 45 regardless of the position setting of the lever 73.

Referring now to the operation of the "inshot" valve arrangement which is included within the piston 46, upon commencement of a rising pressure at the port 42 since the spring 92 is higher rated than spring 93, such pressure begins to be applied through the central aperture of the member 88 to the region above the diaphragm 48 and the pressure 42 continues to be so applied up to a predetermined value at which the piston 88 is downwardly deflected to enable the valve member 91 to engage the annular seat formed in 88 thereby sealing off the path from the port 42 to other than the region above the piston 46. By virtue of this, it will be seen that a load-independent element of pressure output at ports 45 is introduced by virtue of the predetermined inshot pressure above the diaphragm 48. As the pressure at the delivery port 42 increases, this acts downwardly on the central portion 94 to progressively vent the predetermined pressure above the diaphragm 48. At a certain valve of pressure at 42 the pressure above the diaphragm is fully vented. By providing such "inshot" facility which progressively decreases beyond a given value of controlled pressure it is possible to ensure that the trailer brakes are brought into operation even for light-loaded conditions with small degrees of braking but on the other hand the introduction of the inshot does not have the effect of reducing the effective ratio of the valve under light loaded conditions. It will be seen that by including a relay emergency function in a relay valve which in itself is a part of a variable ratio relay valve assembly an economy may be achieved in the number of pipe connections and complexity of a braking system for a fluid pressure operable braked trailer. Although not described with reference to FIG. 1, a similar so-called "inshot" facility to that of FIG. 4 may included in the piston 4 of the proportioning valve of FIG. 1 or FIG. 2.

Whilst the embodiment of FIG. 4 has been particularly described with reference to a variable pressure ratio valve which by way of example is illustrated as used in a three line tractor/trailer vehicle fluid pressure operable braking system the valve is in no way intended to be limited to use in a three line system. Indeed the valve may be employed for example in a two line system.

I claim:

1. A variable pressure ratio valve for the braking system of a vehicle, said ratio valve comprising a housing having input, output, supply and vent ports, a variable area ratio assembly displaceable in said housing to vary the area thereof in response to the pressure differential between the input and output ports, said variable area ratio assembly including a fixed area piston portion communicated to the fluid pressure level at said input port and a variable area portion communicated to the fluid pressure level at said output port, double valve means for controlling communication between the supply, output and vent ports, said double valve means including cylindrical portion means slidably mounted in said housing, means responsive to the load carried by said vehicle for moving the cylindrical portion means within said housing in response to variations in the vehicle load, said double valve means including a pair of valve members carried by said cylindrical portion means for controlling communication between the supply, output and vent ports whereby the position of the valve members in said housing is controlled as a function of the vehicle load, said valve members being communicated to said vent port through said cylindrical portion means.

2. Variable pressure ratio valve as claimed in claim 1, wherein said double valve means includes a closure member carried by the variable area ratio assembly which cooperates with one of the members carried by said cylindrical portion means to control communication to the vent port.

3. Variable pressure ratio valve as claimed in claim 2, wherein said valve members carried by the cylindrical portion means include an annular member carried by the cylindrical portion means and a valve seat movable relative to the cylindrical portion means for engagement with the annular member, and means yieldably urging said valve seat into sealing engagement with the annular member.

4. Variable pressure ratio valve as claimed in claim 1, wherein said valve members carried by the cylindrical portion means include an annular member carried by the cylindrical portion means and a valve seat movable relative to the cylindrical portion means for engagement with the annular member, and means yieldably urging said valve seat into sealing engagement with the annular member.

5. Variable pressure ratio valve as claimed in claim 4, wherein the cylindrical portion means is moved within said housing by a cam and linkage operated in response to weight variations of the vehicle.

6. A variable pressure ratio valve for the braking system of a vehicle, said ratio valve comprising a housing having input, output, supply and vent ports, a variable area ratio assembly displaceable in said housing to vary the area thereof in response to the pressure differential between the input and output ports, double valve means for controlling communication between the supply, output and vent ports, said double valve means including cylindrical portion means slidably mounted in said housing, means responsive to the load carried by said vehicle for moving the cylindrical portion means within said housing in response to variations in the vehicle load, said double valve means including a pair of valve members carried by said cylindrical portion means for controlling communication between the supply, output and vent ports whereby the position of the valve members in said housing is controlled as a function of the vehicle load, said valve members carried by the cylindrical portion means including an annular member carried by the cylindrical portion means and a valve seat movable relative to the cylindrical portion means for engagement with the annular member, and means yieldably urging said vavle seat into sealing engagement with the annular member, said housing including further valve means for communicating the output port with the input port regardless of the position of the cylindrical portion means until the pressure level attains a predetermined value.

7. Variable pressure ratio valve as claimed in claim 6, where said further valve means is carried in the variable area ratio assembly.

8. A variable pressure ratio valve for the braking system of a vehicle, said ratio valve comprising a housing having input, output, supply and vent ports, a variable area ratio assembly displaceable in said housing to vary the area thereof in response to the pressure differential between the input and output ports, double valve means for controlling communication between the supply, output and vent ports, said double valve means including cylindrical portion means slidably mounted in said housing, means responsive to the load carried by said vehicle for moving the cylindrical portion means within said housing in response to variations in the vehicle load, said double valve means including a pair of valve members carried by said cylindrical portion means for controlling communication between the supply, output and vent ports whereby the position of the valve members in said housing is controlled as a function of the vehicle load, said valve members carried by the cylindrical portion means including an annular member carried by the cylindrical portion means and a valve seat movable relative to the cylindrical portion means for engagement with the annular member, and means yieldably urging said valve seat into sealing engagement with the annular member, said housing including a further input port, said double valve means including means for biasing said double valve means to a fully open position to connect the supply port to the output port, and means responsive to a predetermined pressure at said further input port to override said biasing means.

9. Variable pressure ratio valve as claimed in claim 8, wherein a check valve controls communication between the further input port and the supply port.

* * * * *